(12) United States Patent
Dahl et al.

(10) Patent No.: US 8,289,672 B2
(45) Date of Patent: Oct. 16, 2012

(54) LIGHTNING DIVERTER FOR CONDUCTING A LIGHTNING-INDUCED ELECTRICAL CURRENT AND A METHOD OF PRODUCING THE SAME

(75) Inventors: Morten Dahl, Kolding (DK); Lars Tilsted Lilleheden, Kolding (DK); Lars Bo Hansen, Agerskov (DK)

(73) Assignee: LM Glasfiber A/S, Lunderskov (DK)

( * ) Notice: Subject to any disclaimer, the term of this patent is extended or adjusted under 35 U.S.C. 154(b) by 11 days.

(21) Appl. No.: 12/942,582

(22) Filed: Nov. 9, 2010

(65) Prior Publication Data

US 2011/0116929 A1    May 19, 2011

Related U.S. Application Data

(62) Division of application No. 10/586,557, filed as application No. PCT/DK2005/000048 on Jan. 24, 2005, now Pat. No. 7,859,817.

(30) Foreign Application Priority Data

Jan. 23, 2004   (PA) .................................. 200400094

(51) Int. Cl.
*H05F 3/00*    (2006.01)

(52) U.S. Cl. ....................................... 361/218; 361/217

(58) Field of Classification Search .................... 361/218
See application file for complete search history.

(56) References Cited

U.S. PATENT DOCUMENTS

| | | | |
|---|---|---|---|
| 3,416,027 A | 12/1968 | Amason | |
| 3,989,984 A * | 11/1976 | Amason et al. | 361/212 |
| 4,237,514 A | 12/1980 | Cline | |
| 4,506,311 A | 3/1985 | Cline | |
| 4,583,702 A | 4/1986 | Baldwin | |
| 4,796,153 A | 1/1989 | Amason | |
| 4,824,713 A | 4/1989 | Brick | |
| 5,841,066 A | 11/1998 | Bocherens | |
| 2001/0033368 A1 * | 10/2001 | Steijaert et al. | 353/120 |

FOREIGN PATENT DOCUMENTS

WO           01/77527         10/2001

* cited by examiner

*Primary Examiner* — Rexford Barnie
*Assistant Examiner* — Tien Mai
(74) *Attorney, Agent, or Firm* — The Nath Law Group; Jerald L. Meyer; Robert T. Burns

(57) ABSTRACT

The present invention concerns a method of producing a lightning diverter for conducting a lightning-induced electrical current, which is to be placed on structures such as wings on wind turbines, aircraft components, radomes and the like with the purpose of lightning protection. The method comprises the steps of making a plurality of holes in a plate of an electrically conductive material, filling said holes at least partly with one or more electrically non-conductive materials, and then finally dividing the plate—preferably into strips. The lightning diverter obtained hereby consists of a layer of electrically non-conductive material with a plurality of isolated segments of electrically conductive material.

The invention further relates to a diverter strip with isolated segments of concave shapes being advantageous because of the good connection between the segments and the non-conductive material.

10 Claims, 7 Drawing Sheets

LIGHTNING DIVERTER FOR CONDUCTING A LIGHTNING-INDUCED ELECTRICAL CURRENT AND A METHOD OF PRODUCING THE SAME

This application is a divisional of U.S. Ser. No. 10/586,557, filed on Sep. 14, 2006 now U.S. Pat. No. 7,859,817 which was a National Stage of PCT/DK2005/000048, filed on Jan. 24, 2005 which claimed priority from PA 2004 00094, filed Jan. 23, 2004, the contents of each of which are incorporated herein by reference.

The present invention relates to a method of producing a lightning diverter for conducting a lightning-induced electrical current and to be placed on structures such as wings on wind turbines, aircraft components, radomes and the like with the purpose of lightning protection. The present invention further relates to the design of a lightning diverter strip.

BACKGROUND OF THE INVENTION

The increasing development in the field of wind energy plants is reflected in large units with still higher towers and longer blades resulting in the increased risk of being struck by a lightning. The plants are typically secured from lightning strokes, so that a possible lightning current is attracted and led to the ground in a controlled manner in order not to damage the sensitive elements in the wind energy plant. One of the most popular methods for securing lightning is by installing one or more so-called lightning receptors, which are conductive elements, and which are placed e.g. on the tip of the blade and connected to internal conducting cables in the blades. This is e.g. known from EP 0783629.

A similar method has been described in U.S. Pat. No. 6,457,943 according to which a wind turbine blade is constructed with long parts of carbon fibre material in the total length of the blade. The carbon fibres, which are conductive, are thus acting as a lightning receptor, and the lightning current is led through the material and down into internally placed conducting cables. This method thus relates to the construction of the entire blade, and it not only requires the use of carbon fibres in large parts of the blade, which is not always desirable, but also a specific thickness of the carbon fibre parts so that the material can lead the lightning current without being damaged.

The blades are usually the longest part of the wind energy plant, and they therefore have an increased risk of being struck by a lightning. Wind energy plants are placed in e.g. large numbers in the sea in the form of windmill farms, resulting in the fact that service and maintenance becomes rather expensive and complex due to weather conditions and difficult access conditions. Salt from the air deposits on e.g. the blades, thus making these conductive, which again increases the risk of these being struck by a lightning.

In WO 01/77527 it is suggested to glue or tape strips of copper strings on to the blades and connect the strings to the receptors. The strings are intended to conduct a lightning current to a receptor, from where it can be led to the ground via a cable. This implies that the strings have sufficient conductivity in order to be able to hold a lightning current which may exceed 50 kA. The strings must be exchangeable after strokes of lightning due to the damage caused by the strong heating resulting from the lightning current, which not only means monitoring of the wind energy plant and standstill during change, but also big expenses. There is furthermore the risk of the strings getting loose and consequently affecting the aerodynamic properties of the blade negatively. The strings must otherwise be made of a heavy material, resulting in undesired extra weight on the blade. One of the problems when designing long blades is to lower the weight, in that the weight in itself not only makes the blades even heavier, but also the hub, the nacelle and the tower.

Aircrafts are also exposed to lightning strokes and must therefore be secured from these. Aircrafts are equipped with radar installations, e.g. in connection with navigation, which are often placed in the nose of the aircraft in order to be able to look ahead. When radar equipment is placed in the nose of the aircraft, the nose is not made from aluminum like the remaining part of the aircraft. Rather, it is made of a certain plastic material, as the radar otherwise would be unable to see through the nose. The nose must also be secured from lightning strokes, but it must be done in a specific way in order not to disturb the radar. Since the 1960's, the idea of lightning protection by means of so-called lightning diverter strips, which may be of different shapes, has been known. One example is seen in U.S. Pat. No. 4,237,514, where a base, supplied with aluminum powder, is glued on to e.g. the nose of an aircraft in strips.

The aluminum powder does not constitute a continuous conductor, but rather disrupted or segmented, conductive particles. When these metallic and conductive particles are exposed to a strong electrical field as the result of a lightning stroke, short circuit among the particles takes place, and a conductive ionized channel is created in the air above the particles in which the current lightning can be led to e.g. some metal part of the aircraft. Instead of aluminum powder, U.S. Pat. No. 4,506,311 describes button- or diamond-shaped metal pieces, which are separately incorporated into a base shaped as a ribbon. Both ribbons and strips are intended for installation outside of the nose of the aircraft, where they are placed symmetrically radiating from the tip of the nose. Such a position provides a good protection, but at the same time it results in aerodynamic disturbance. Furthermore, these strips have the disadvantages of not lasting very long, as the segments easily get ripped off the base into which they are incorporated, either by the lightning or by simple wear. Therefore, these ribbons often need to be renewed when having been exposed to lightning. However, in many applications this is very costly and impractical. Diverter strips according to U.S. Pat. No. 4,506,311 are furthermore seen to have the problem that the lightning current can jump from underneath the segments to the next, which increases the risk of the current jumping into the structure, which should be protected by the diverter. Another disadvantage is that the strips are difficult to fasten onto the surfaces without unwillingly stretching the strips or ribbons a little, thereby changing the distances between the segments accordingly. This again changes the lift-off capacity of the strip as well as making small openings in the material where water can penetrate and start deterioration of the material.

OBJECT AND SUMMARY OF THE INVENTION

It is therefore an object of the present invention to present a segmented diverter strip with a longer life-time than existing models and with as low as possible lift-off capacity to be an effective lightning conductor, and yet on the same time being simple and easy to place even on curved surfaces. It is a further objective to describe a method of production of diverter strips, which is cost effective but also provides high accuracy as to the spacing of the segments and their adhesion to the layer underneath.

The invention describes a method of producing a lightning diverter for conducting a lightning-induced electrical current to be placed on structures such as wings on wind turbines, aircraft components, radomes and the like with the purpose of lightning protection. The method comprises the steps of making of a plurality of holes in a plate of electrically conductive material, filling said holes at least partly with one or more electrically non-conductive materials, and then dividing the plate, whereby a layer of electrically non-conductive material with a plurality of isolated segments of electrically conductive material is obtained.

The invention described by the above is advantageous in that it is possible to produce one or more diverter strips with high precision and very low tolerances. It is possible to control all important parameters of the product such as the distances between the segments of the resulting diverter strip, the surface area and quality of the segments, the thickness of the layer of non-conductive material underneath the segments, and the adhesion of the segments to the non-conduction material—parameters that are all very important to the quality and effectiveness of the final diverter strip. On the same time the method of production according to the invention does not require any special facilities or machinery for the production and is a fairly simple and cost-effective process. Furthermore, it is simple to change the parameters in the process—for instance to produce diverter strips with different shapes of the segments or of a different thickness.

The invention further relates to a method of producing a lightning diverter according to the above description where the plate is divided into strips. By dividing the plate into strips as one of the last steps in the method of production it is obtained that it is not a number of isolated segments that have to be handled and arranged in the production process, but instead a plate with holes. In this way the positioning of the segments in the adhesive becomes a fully controlled process, which to a large extent ensures the quality of the final diverter strips.

Furthermore, the invention relates to a method of producing a lightning diverter according to the above where the holes in the plate are made by cutting, preferably by laser cutting or by punching. These production methods are advantageous as they are fast, but still it is possible to cut the holes in the plate in the desired pattern with a high degree of precision and with the possibility to make as well sharp as round corners.

In one embodiment of the invention the electrically conductive material is preferably a metal—such as stainless steel, brass, cobber, brass coated with nickel or varnished cobber. Metals are in general materials with good electrical conducting properties and are thus advantageous. Metals with a low tendency to oxidation by the surrounding air are preferable. Further, metals have a high resistance to the wear that the diverter strip on an exposed surface is subjected to.

In another embodiment of the invention the electrically non-conductive material is preferably an adhesive—such as MS Polymer, or a thermoplastic material or rubber. An adhesive is advantageous in that it is possible to obtain a good connectivity between the segments and the non-conductive material. This partly ensures that the segments stay in place and do not fall off or get ripped off by the lightning current, which would otherwise decrease or even destroy the functionality of the diverter strip. Furthermore, the mentioned materials are non-expensive materials and with good production properties in relation to the method of production described by the invention. The adhesives mentioned also pose a high flexibility, which ensures that the resulting diverter strip can be applied equally well to curved or uneven surfaces. Also the mentioned materials all have good resistance to ultraviolet light and both high and low temperatures, thereby ensuring a longer life-time. Yet another advantage is the possibility to color the adhesive according to specific wishes.

The invention further relates to a method of producing a lightning diverter according to the earlier description, where the holes in the plate are at least partially filled by pressing the plate down into a layer of electrically non-conductive material. This describes a simple way to both embed the segments into the adhesive and to ensure that the adhesive fully surrounds all the segments.

The invention also describes a method of producing a lightning diverter according to the above, and where the method further comprises applying a layer of material increasing the stiffness of the lightning diverter in the direction along the strip and a further layer of electrically non-conductive material to the first layer of electrically non-conductive material. Hereby is by simple means obtained that the resulting diverter strip is not easily stretched along its longitudinal direction for instance during the application of the strip to a surface. Such a stretching is to be avoided as this would change the distances from one segment of conductive material to the next, thus changing the spark-over voltage and lift-off capacity of the strip. On the other hand, the production method described above does not change the ability of the lightning diverter strip to be applied onto uneven surfaces and does not increase the cost of the process significantly.

In an embodiment of the invention the method of producing a lightning diverter as described above further comprises applying a double sided adhesive tape to the outermost layer of electrically non-conductive material. This double sided adhesive tape eases the application of the lightning diverter strip to the surface it is to protect from lightning. Furthermore, the tape can be used during the manufacture to better control the process by guiding the tape on a solid support.

The present invention furthermore describes a lightning diverter for conducting a lightning-induced electrical current and to be placed on structures such as blades on wind turbines, aircraft components, radomes and the like with the purpose of lightning protection, where the diverter comprises a layer of electrically non-conductive material with a plurality of isolated segments of electrically conductive material, and where the exposed parts of said segments are described by concave shapes. Hereby is obtained a lightning diverter where the concave shapes by having larger circumferences increase the connectivity of the segments to the non-conductive material significantly. This connectivity in turn prolongs the life-time of the diverter, as the segments do not get ripped off, neither by common wear nor by the lightning currents. The good connectivity further ensures that the lightning induced current can not run down into the structure onto which the diverter is fastened, and further prevents the penetration of water, which would otherwise reduce the life-time of the diverter.

In a further embodiment of the invention a lightning diverter according to the above is in the shape of a strip. Hereby the lightning induced current can be guided in the direction of the strip to for instance some kind of receptor connected to grounding means. A strip is furthermore easy to orientate on a surface according to specific needs.

In yet a further embodiment of the invention a lightning diverter according to all or some of the above is characterized by a number of the isolated segments being cross-shaped or star-shaped. These shapes are advantageous in that their connectivity to the surrounding material can be optimal. Furthermore it can be well controlled where the sparks will jump from one segment to the next whereby the diverter can be designed to obtain a specific optimal spark-over voltage. Theses shapes make it possible to obtain a diverter with a low spark-over voltage as well as lift-off capacity, which is favorable in most applications. Also these shapes are advantageous in that the diverter strip then can be manufactured using the method of production also described by this invention.

In one embodiment a lightning diverter according to the invention can also comprise a layer of material increasing the stiffness of the lightning diverter in the direction along the strip. Hereby is by simple means obtained a diverter strip, which can not easily be stretched in its longitudinal direction, whereby it is assured that the distances between the segments remain unchanged during application of the diverter to surfaces. This is important as these distances define the lift-off capacity of the strip, and thus a change will change the qualities of the diverter accordingly.

A lightning diverter according to the invention can in another embodiment comprise an outermost layer of double sided adhesive tape. Hereby is obtained a diverter, which is ready and easy to be applied to a surface. This further increases the quality of the diverter as a good fastening of the diverter to the exposed structure is essential for its functioning and increases its life-time.

The invention further relates to a lightning diverter according to some or all of the above, where the segments are preferably made of metal such as stainless steel, brass, cobber, brass coated with nickel or varnished cobber, and/or the electrically non-conductive material is preferably made of an adhesive such as MS Polymer, or a thermoplastic material or rubber. The advantages hereof are as described above for the method of production.

Finally, the invention describes a blade for a wind turbine, the blade comprising a fibre-reinforced blade shell and means for grounding a lightning-induced electrical current, where the blade is equipped with at least one diverter strip produced according to one or more of the embodiments mentioned above. Hereby is obtained a blade with the same advantages as described above for a diverter strip produced by a method according to the invention, including that the blade is capable of withstanding a number of lightning strikes, as the lightning induced electrical current is conducted in a ionized channel in the air above the diverter strip, as well as the diverter strips being of low weight, that the diverter strips are not prone to crack etc.

BRIEF DESCRIPTION OF THE DRAWINGS

In the following, preferred embodiments of the invention will be described referring to the figures, where.

DESCRIPTION OF PREFERRED EMBODIMENTS

Figure 1:
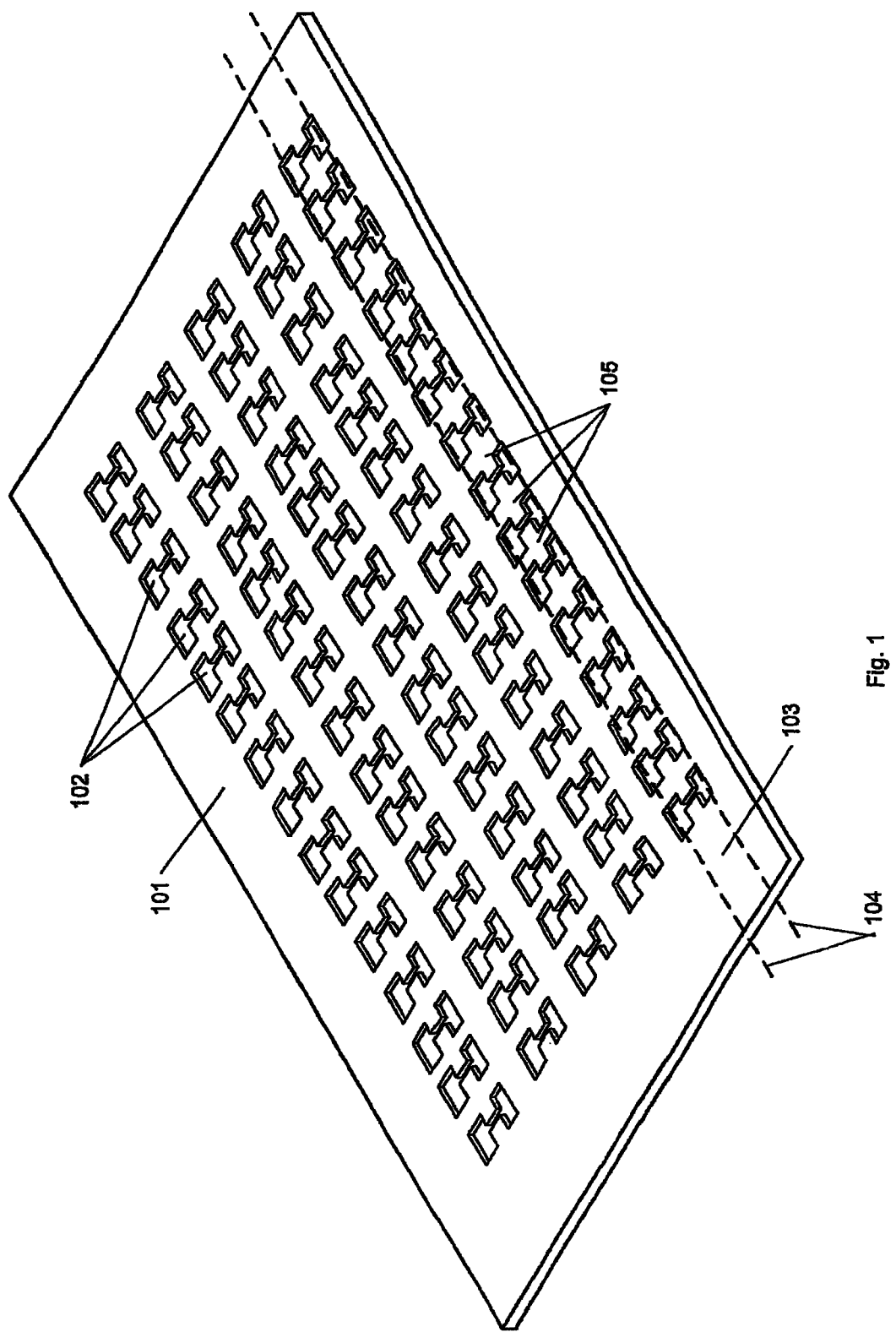
FIG. 1 shows a plate of metal with a pattern cut into it for the production of a diverter strip.
Figure 9:
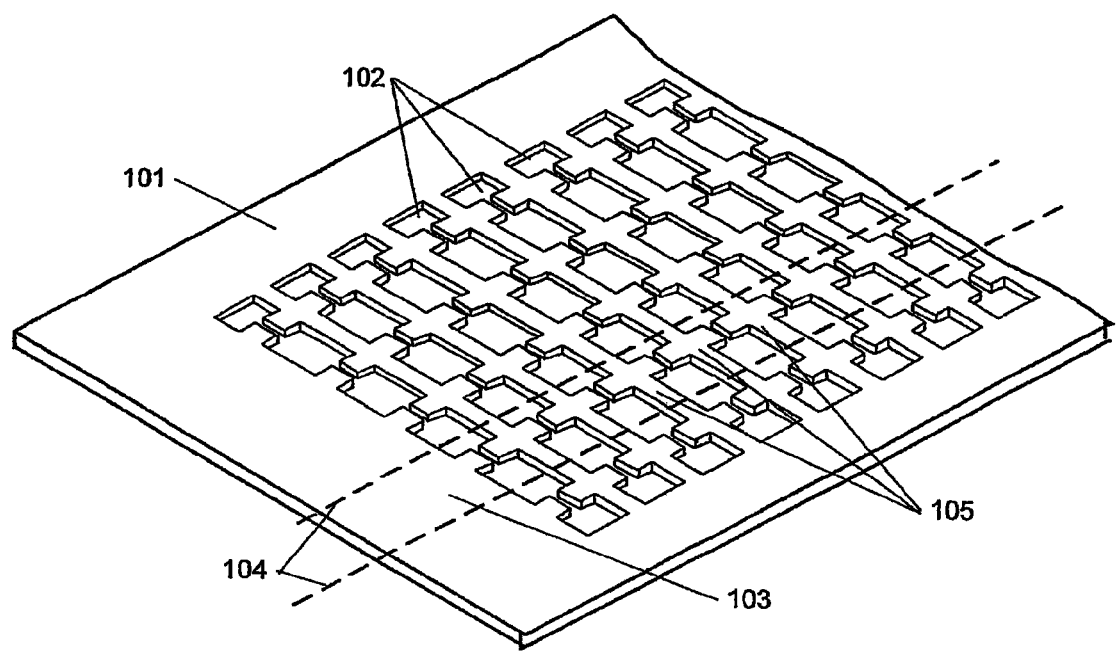
FIGS. 9 and 10 show two different plate designs with different patterns for use in the manufacture of diverter strips.
Figure 10:
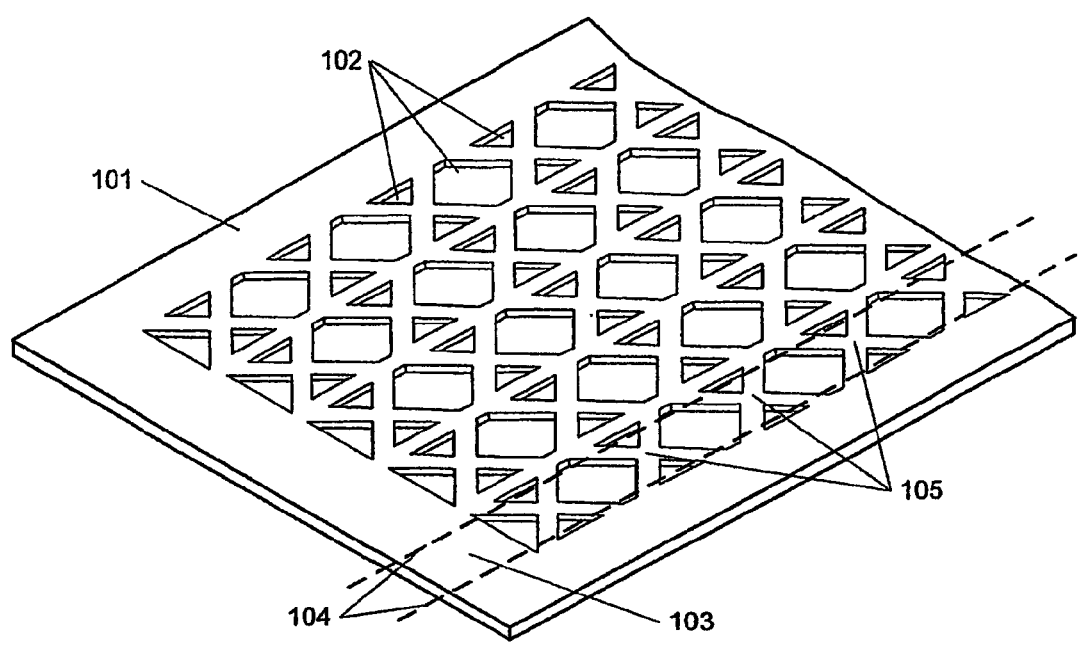

FIG. 1 shows a plate 101 used in the production of a lightning diverter as described in the following. The plate 101 is made of a material with good electrically conducting properties, preferably a metal such as stainless steel, cobber, brass or the like. A number of holes 102 is cut into the plate 101 e.g. by laser cutting or punching. The holes 102 are applied in a pattern designed so that the plate can be divided into one or more strips 103 as shown by the hatched lines 104 in the figures where the strip will then consist of a number of segments 105 all spaced apart and not connected. The strip 103 does not necessarily have to be straight, but can be in any desired curved shape suitable for its purpose. In the embodiment of the plate as shown in FIG. 1 the resulting diverter will be a strip with a number of cross-shaped segments. Different patterns are shown in FIGS. 9 and 10.

Figure 2:
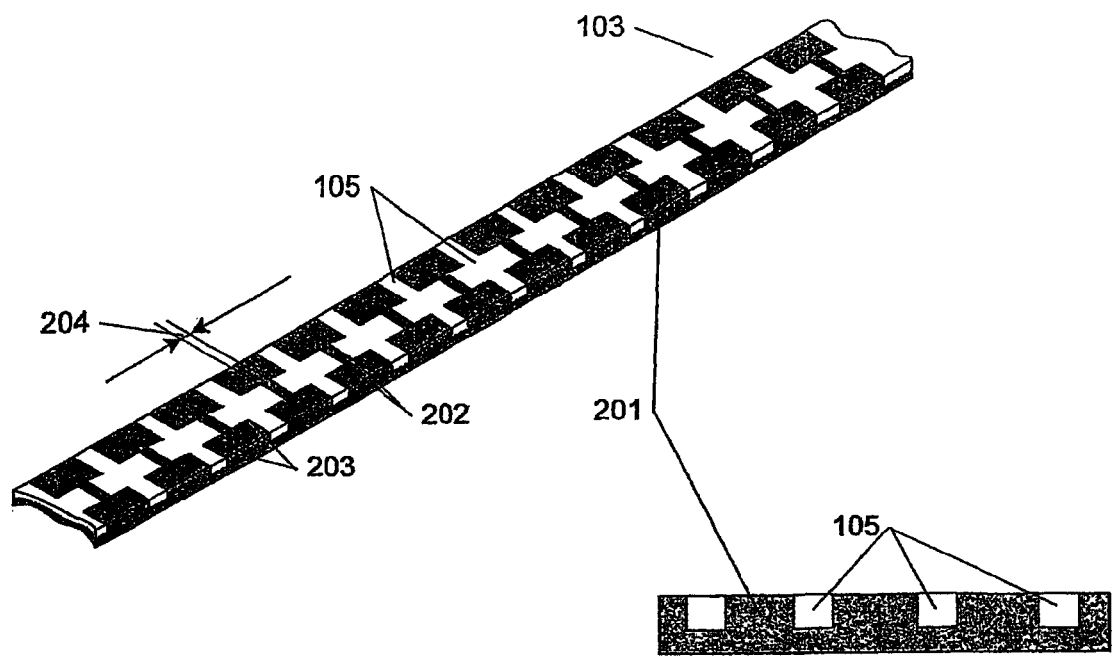
FIG. 2 shows one embodiment of a diverter strip as described by the invention.

Before the plate 101 is divided, the holes are filled with an electrically non-conductive material preferably an adhesive such as MS Polymer. It could also be a thermoplastic material or a rubber. This material is then left to cure. The result after cutting the plate into strips is one or more diverter strips as shown in FIG. 2 in perspective and as seen from the side consisting of a layer of electrically non-conductive material 201 into which is placed a plurality of segments of electrically conductive material 105. In this embodiment of the invention the segments 105 are shaped as crosses, which are advantageous as the attachment of the segments 105 to the non-conductive material 201 thus is optimal. Other shapes are shown in figures in the following. The segments are exposed on the upper side and will act as attracters to a lightning. As the segments are isolated, and do not touch each other, the air above the strip will be ionized, and the lightning current will run in an ionized channel above the diverter strip. It is important for the efficiency of the diverter strip that the segments are fully covered by non-conductive material underneath, so that the current induced by the lightning can not run down-wards into the structure. Also, the fairly sharp corners 202 at the end of the crosses facilitate the jump of the lightning current from one segment to the next. Such corners will thus lower the spark-over voltage as well as the lift-off capacity of the strip. On the other hand, the inner corners in the crosses 203 are rounded in order to minimize the risk of crack formation from these corners.

The shape of the segments in one diverter strip can also vary along the length of the strip. Another dimensioning parameter for a diverter strip is the distance or the gap 204 between the segments. The smaller the distance the lower the spark-over voltage of the strip. Therefore, a small distance is advantageous. On the other hand a too small a distance can result in the lightning current running through the strip which is to be avoided. In one embodiment of the invention the distances between the segments 204 are varied along the length of the strip which starts the desired ionization of the air above the diverter strip sooner than if the segments were all placed with the same distances. Such a variation is furthermore seen to result in a diverter strip with a longer lifetime. The sizes of the distances between the segments 204 lie in the range of 0.1 to 5 mm, preferably 0.3 to 1.5 mm.

Figure 3:
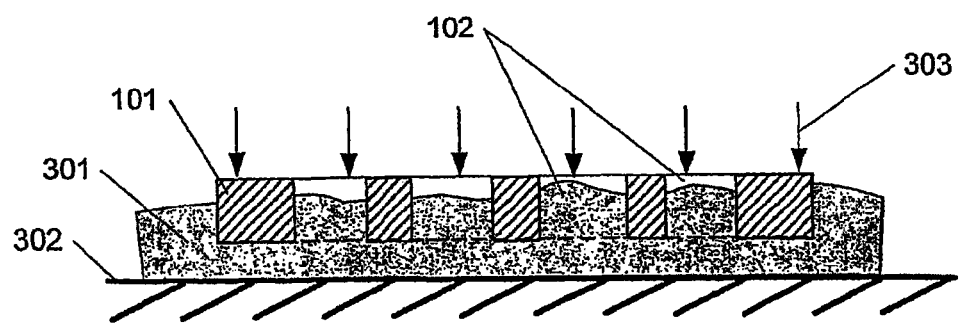
FIG. 3 illustrates the steps in a method of producing a diverter strip.

A method of producing the described diverter strip is illustrated in FIG. 3 as seen in a cross-sectional view. It consists of applying a layer 301 of electrically non-conductive or insulating material to a flat surface 302. If a MS polymer is used the production is performed with heated tools in order to better control the processes. A plate 101 with a number of holes 102 in a pattern such as the one shown in FIG. 1 is then simply put on top of the layer of insulating material allowing the adhesive to fill the holes at least partly for instance by applying a slight pressure to the plate pressing it down into the adhesive as illustrated by the arrows 303. It is important for the efficiency of the diverter to ensure that the plate is fully covered by the insulating material 301 underneath. In one embodiment of the method the plate 101 is grinded and pickled before use in order to further improve the connection between the plate 101 and the adhesive 301. In a further embodiment of the production method yet a thin layer of the adhesive is applied on top of metal plate in order to ensure that the segments are to be fully surrounded by/embedded in the adhesive. The material is then left to harden or cure. If a MS Polymer is used it will cure by means of the moisture from the air. The surface is then afterwards polished down, so the surface of the metal plate is exposed and open to the elements and free to attract the lightning. In one embodiment of the method of production the surface is further washed or rinsed, so that it is totally free of any dust from the polishing, and the center of each strip is then covered with a tape for protection of the clean surface (not shown in the figure). The product is then divided into oblong strips, e.g. by cutting, and the strips are then ready to apply to structures to be protected from lightning. The tape protecting the clean and polished segments is to be removed when the diverter strip has been fastened to the exposed structure. Because of the flexibility of the electrically non-conductive material, the strip can easily be fastened with a good connectivity onto curved surfaces of structures. Furthermore, the flexibility of the strips ensures that the strip can follow the deflections and the working of the structure, onto which it is fastened, whereby the efficiency and the lifetime of the diverter strip are prolonged. The manufacture can also be turned upside down in the sense that the resulting upper surface is pointing downwards during the production. The plate 101 is then first laid down next to the flat surface 302, and then the layer of non-conductive material 301 is applied both filling up the holes 102 in the plate 101 and forming the layer insulating the segments from the structure in the resulting diverter strip.

Figure 4:
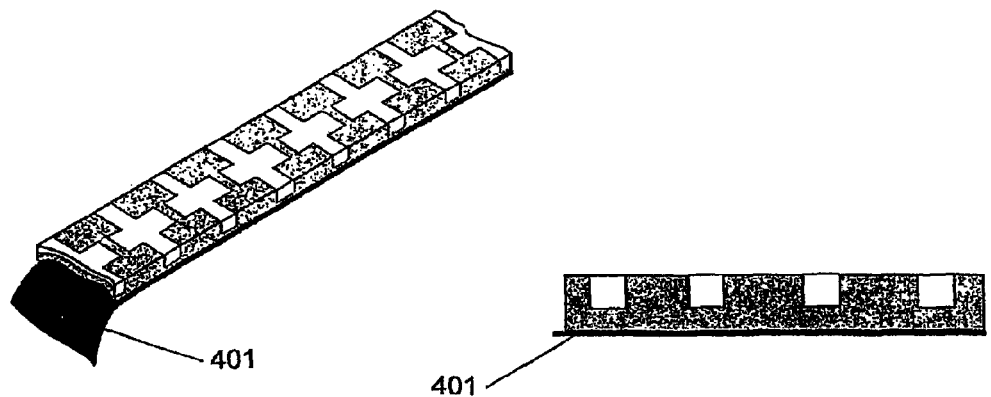
FIG. 4 shows a diverter strip with a layer of double sided tape.

In order to ease the fastening of the diverter strip to structures, a layer of double sided adhesive tape 401 can be attached underneath the diverter. Such a diverter strip 103 is shown in FIG. 4. During manufacture, the adhesive tape can then be laid down as a first step then applying the layer of non-conductive material on top etc. as explained above.

Figure 5:
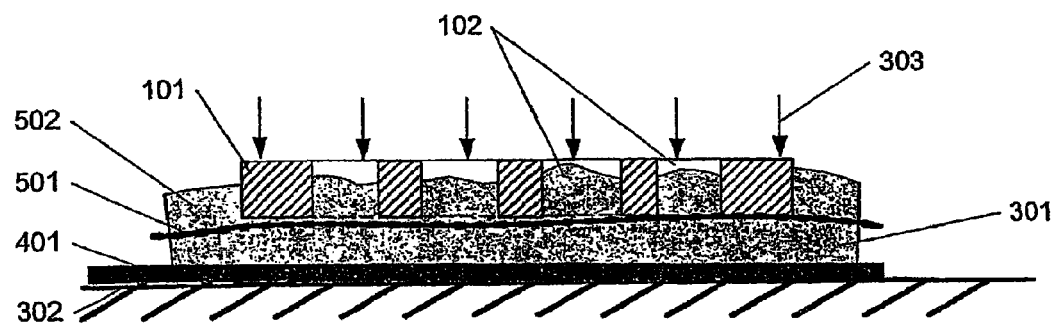
FIG. 5 shows the steps in a further method of producing a diverter strip.

In another embodiment of the method according to the invention illustrated in FIG. 5, the diverter is further comprising a tissue 501 underneath the metal plate 101. The method then consists of the following steps: laying out the double sided tape 401 (optionally), applying a layer of adhesive 301, Then applying the tissue 501, and then a further layer of adhesive 502 followed by pressing the plate of conductive material 101 gently down into the adhesive 502. Finally, a final thin layer of adhesive (not shown) can be applied over the plate to ensure filling up the holes 102 in the plate completely. The product is then left to cure, and afterwards the upper surface is polished to expose the segments and cleaned. As described before, a tape can then also be applied to protect the surfaces of the segments. The combined plate is then finally divided or cut into strips. The tissue 501 could for instance be a thin glass fabric. The tissue 501 serves to make the strip unstretchable in its longitudinal direction to ensure that the spacing of the segments and hence the lift-off capacity of the strip are kept unchanged during handling and fastening of the diverter strip. On the other hand, the tissue 501 does not alter the flexibility of the strip and its ability to be optimally connected to curved and uneven structural surfaces.

Figure 6:
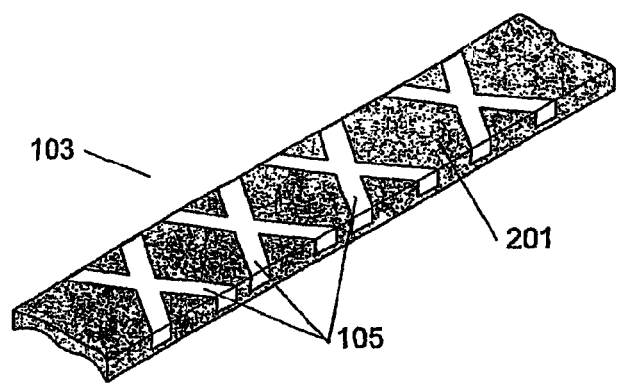
FIG. 6 shows another embodiment of a diverter strip according to the invention.
Figure 7:
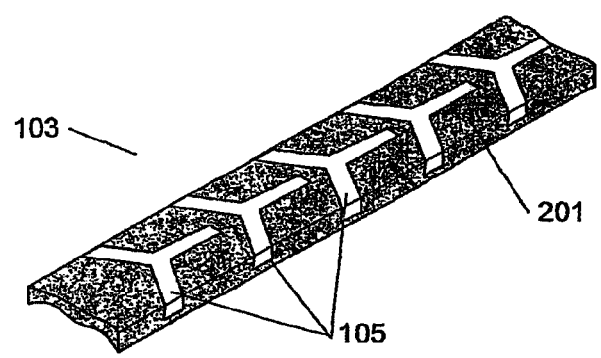
FIG. 7 shows yet another embodiment of a diverter strip according to the invention.
Figure 8:
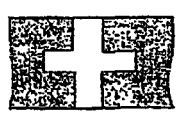
FIG. 8 shows different segment shapes for use in the diverter strip.
Figure 8:
Figure 8:
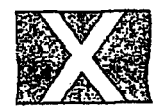
Figure 8:
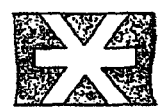
Figure 8:
Figure 8:
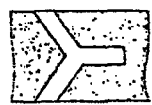
Figure 8:
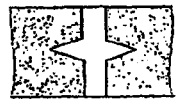
Figure 8:
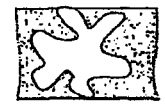

The FIGS. 6-8 illustrate different shapes of the segments 105 of the conductive material in the diverter strips 103 according to the invention. In general the segments 105 can have any concave shape as for instance cross-shaped as in FIG. 6, shaped as a star, as a 'hen feet' (as sketched in FIG. 7), or potato-shaped. Different embodiments are illustrated in FIG. 8. The shape of the segments in one diverter strip can also vary along the length of the strip. Their concave (or non-convex) shape increases the attachment between the segment 105 and the surrounding non-conductive material 201 partly because of the larger circumference of the segments. As described earlier, a corner (preferably sharp) is advantageous where one segment is the closest to its neighboring segment, as this is where the current will jump from the one segment to the next. Such a corner will thus lower the spark-over voltage of the strip. Another dimensioning parameter for a diverter strip is the distance or the gap between the segments. The smaller the distance the lower the spark-over voltage of the strip. Therefore, a small distance is advantageous. On the other hand, a too small distance can result in the lightning current running through the strip, which is to be avoided. In one embodiment of the invention, the distances between the segments are varied along the length of the strip, which starts the desired ionization of the air above the diverter strip sooner than if the segments were all placed with the same distances. Such a variation is furthermore seen to result in a diverter strip with a longer lifetime. In a further embodiment of a diverter strip the segments reach out a little from the surrounding non-conductive material, thereby acting as more visible attracters to a lightning.

FIGS. 9 and 10 show two other design possibilities for the conductive plate 101 to be used in the manufacture of the diverter strip as described earlier. Only parts of the plates are shown. The plates are filled at least partly with a non-conductive material in some way, and then divided into strips as shown by the hatched lines 104. The pattern of the holes 102 in both plates is so that the resulting diverter strips 103 will contain segments 105 spaced apart in the shapes of crosses in both figures but oriented differently.

Figure 11:
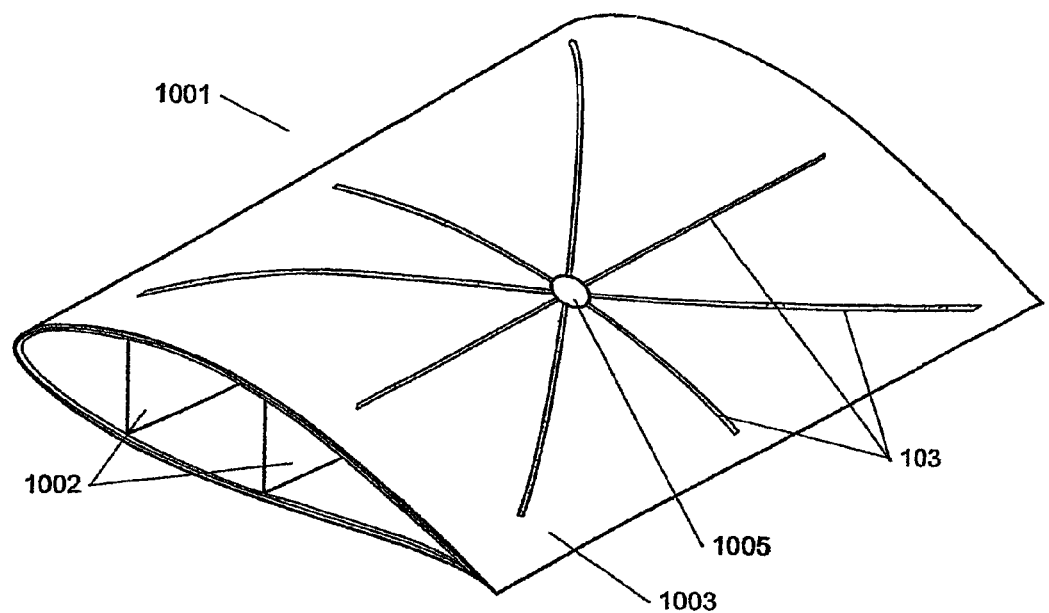
FIGS. 11 and 12 show a part of a blade for a wind turbine with diverter strips on the surface of blade.

FIG. 11 shows a blade for a wind turbine, which comprises a blade shell 1001 with reinforcements 1002. The blade shell 1001 comprises an outer surface 1003, which is furnished with diverter strips 103. The diverter strips 103 are placed in lengths and linked to grounded conducting cables. The diverter strips 103 are in FIG. 11 placed so that they radiate from a receptor 1005, which is connected to conducting cables (not shown), which can be grounded to earth. The diverter strips 103 can run primarily transversely to the blade 1001 in between the leading edge and tailing edge of the blade, or they can be placed in the shape of a star as sketched in the figure. In the embodiment of FIG. 11, the diverter strips 103 have an antenna-like effect to any conductive fibres, which might be present in the blade shell 1001.

Figure 12:
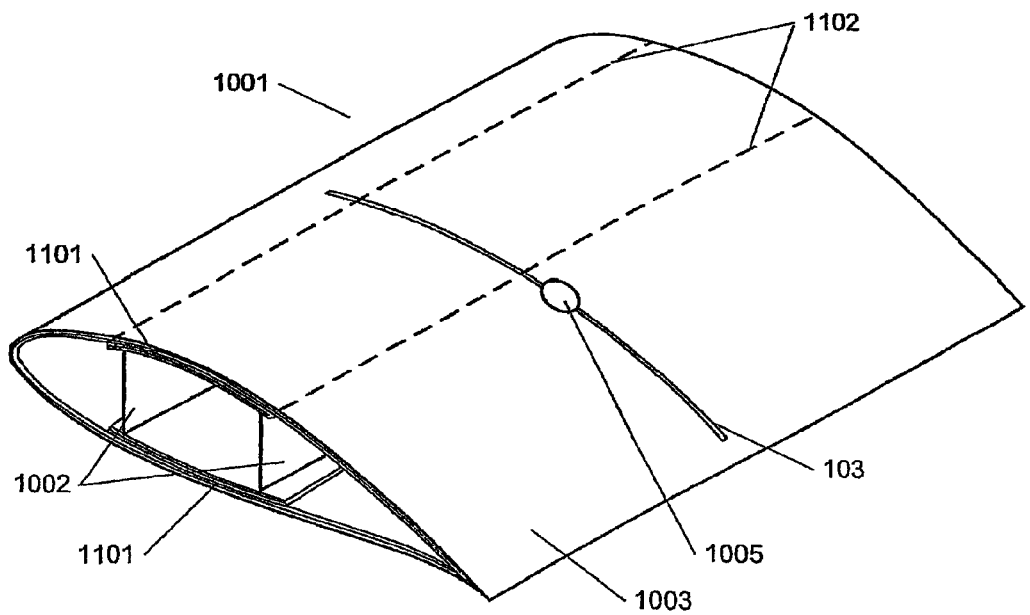

FIG. 12 shows a blade for a wind turbine, which comprises a blade shell 1001 with reinforcements 1002. The blade shell 1001 comprises an outer surface 1003, which is furnished with diverter strips 103. The diverter strips 103 are placed in lengths and radiate from a receptor 1005, which is connected to conducting cables (not shown), which can be grounded to earth. In FIG. 12, the diverter strips 103 primarily run transversely to the blade 1001 in between the leading edge and tailing edge of the blade. In an embodiment, the blade shell comprises two principal laminates 1101, which contain conductive fibres, such as carbon fibres or steel fibres. The upper principal laminate 1101 has a width as indicated by the hatched lines 1102. As illustrated, a diverter strip 103 stretches from a receptor 1005 and across the principal laminate 1101, so that it is shielded from a lightning stroke in that an antenna-like effect is achieved by the diverter strip. In the illustrated embodiment the receptor 1005 is placed at a distance from the principal laminate 1101.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of producing a lightning diverter for conducting a lightning-induced electrical current on structures such as wings, wind turbines, aircraft components, radomes and the like with the purpose of lightning protection, comprising the steps of:
    making of a plurality of holes in a plate of an electrically conductive material,
    filling said holes at least partly with one or more electrically nonconductive materials, and
    dividing the plate to obtain a first layer of electrically non conductive material with a plurality of isolated segments of electrically conductive material.

2. The method of claim 1, further comprising the step of dividing the plate into strips.

3. The method of claim 1, where the holes in the plate are made by laser cutting.

4. The method of claim 1, where the holes in the plate are made by punching.

5. The method of claim 1, where the electrically conductive material is metal.

6. The method of claim 1, where the electrically non-conductive material is adhesive.

7. The method of claim 1, where the holes in the plate are at least partially filled by pressing the plate down into a layer of electrically nonconductive material.

8. The method of claim 2, further comprising the steps of:
    applying a layer of material increasing the stiffness of the lightning diverter in a direction along a strip; and
    applying a further layer of electrically non-conductive material to the first layer of electrically non-conductive material.

9. The method of claim 1, further comprising the step of applying a double-sided adhesive tape to an outermost layer of electrically nonconductive material.

10. A blade for a wind turbine, comprising:
    a fiber reinforced blade shell;
    means for grounding a lightning-induced electrical current; and
    at least one diverter strip having a plurality of holes in a plate of an electrically conductive material, wherein
    the plurality of holes is at least partly filled with one or more electrically nonconductive materials, and
    the one or more electrically nonconductive materials divide the plate, and form a layer of electrically non-conductive material with a plurality of isolated segments of electrically conductive material.

* * * * *